United States Patent [19]
Bugh

[11] 3,792,900
[45] Feb. 19, 1974

[54] TIE-DOWN APPARATUS FOR A VEHICLE MOUNTED CAMPER

[76] Inventor: Clayton G. Bugh, 1122 W. Willow, Cherokee, Iowa 51012

[22] Filed: Aug. 10, 1972

[21] Appl. No.: 279,547

[52] U.S. Cl.......................... 296/23 MC, 280/179 R
[51] Int. Cl................................................ B60p 3/32
[58] Field of Search 280/179 R, 179 A; 296/23 MC; 248/361

[56] References Cited
UNITED STATES PATENTS

| | | | |
|---|---|---|---|
| 3,706,469 | 12/1972 | Covert | 296/23 MC |
| 3,719,382 | 3/1973 | Palm | 296/23 MC |
| 3,655,234 | 4/1972 | Kirschbaum | 296/23 MC |
| 3,580,599 | 5/1971 | Dodgen | 296/23 MC |
| 3,368,785 | 2/1968 | Weiler | 248/361 |

Primary Examiner—Robert R. Song
Attorney, Agent, or Firm—Zarley, McKee & Thomte

[57] ABSTRACT

A tie-down apparatus for a truck-mounted camper is disclosed herein. The truck frame comprises first and second longitudinally extending frame members with a bed operatively secured thereto. The camper means is mounted on the bed means with the apparatus of this invention maintaining the camper means in the bed. A first bracket is secured to the first frame member and extends outwardly therefrom with a second bracket being secured to the second frame member and extending outwardly therefrom. A flexible connection means connects opposite sides of the camper to the outer ends of the brackets. Each of the brackets comprises a support plate detachably secured to the frame member by top and bottom clamps. An elongated arm is pivotally secured at its inner end to the lower end of the support plate and extends outwardly therefrom with a second elongated arm being adjustably secured to the upper end of the support plate and extending outwardly and downwardly therefrom. The outer end of the second arm is secured to the first arm intermediate the length thereof. The flexible connection means is secured to the outer end of the first arm.

8 Claims, 4 Drawing Figures

PATENTED FEB 19 1974 3,792,900
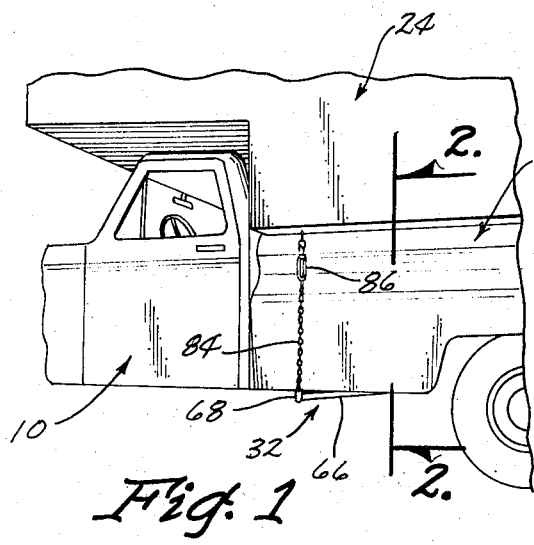
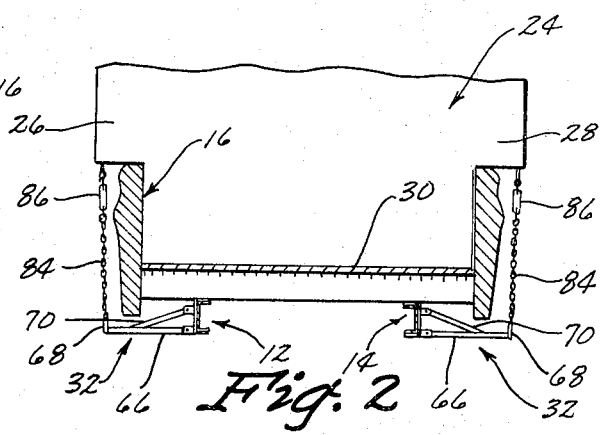
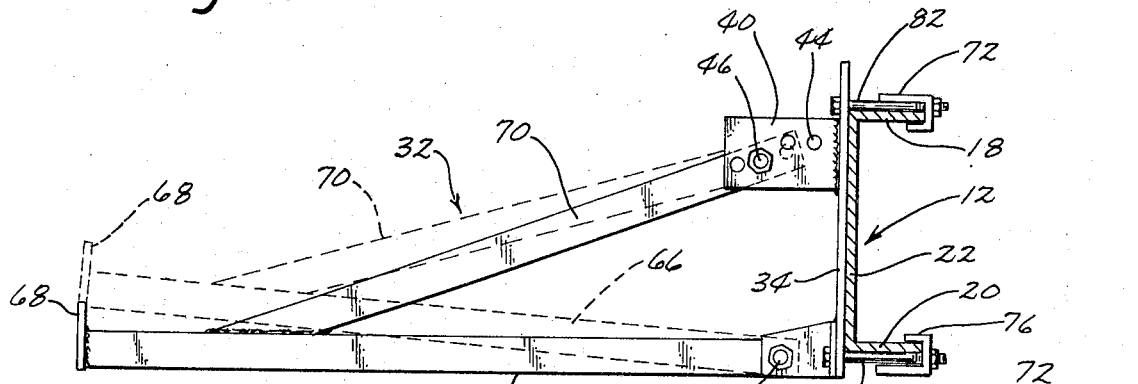
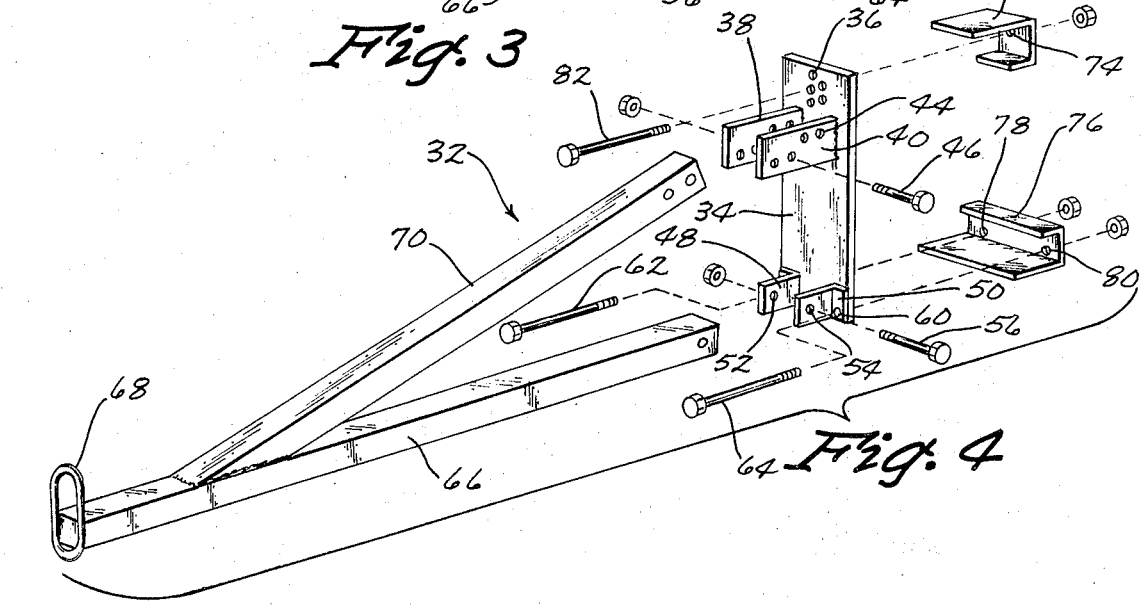

TIE-DOWN APPARATUS FOR A VEHICLE MOUNTED CAMPER

Conventional vehicle-mounted campers are normally maintained in the truck bed or the like by means of brackets which are mounted in the stave pockets of the camper bed. Such an arrangement is quite insecure since the brackets are not ordinarily adequately welded to the box or bed. Additionally, the bed or box does not adequately hold the camper down.

Therefore, it is the principal object of this invention to provide an improved tie-down apparatus for a vehicle-mounted camper.

A fruther object of this invention is to provide a tie-down apparatus for a vehicle-mounted camper which is detachably connected to the vehicle frame.

A further object of this invention is to provide a tie-down apparatus for a vehicle-mounted camper having means thereon for adjustably positioning the outwardly extending bracket arms.

A further object of this invention is to provide a tie-down apparatus for a vehicle-mounted camper having adjustment means thereon to permit the apparatus to be mounted on various vehicles.

A further object of this invention is to provide a tie-down apparatus for a vehicle-mounted camper which positively maintains the camper within the vehicle bed.

A further object of this invention is to provide a tie-down apparatus for a vehicle-mounted camper which does not detract from the asthetic appearance of the camper or vehicle.

A still further object of this invention is to provide a tie-down apparatus for a vehicle-mounted camper which is economical to manufacture, durable in use and refined in appearance.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a partial perspective view of a vehicle-mounted camper and the apparatus of this invention;

FIG. 2 is a sectional view seen along lines 2 — 2 of FIG. 1;

FIG. 3 is a side view of the apparatus of this invention, the broken lines indicating the adjustment of the bracket arms; and FIG. 4 is a exploded perspective view of the apparatus of this invention.

The numeral 10 generally refers to a vehicle such as a truck or the like including a pair of longitudinally extending frame members 12 and 14 upon which is mounted a conventional bed or box 16. Frame member 12 comprises top flange 18, bottom flange 20 and side 22. Frame member 14 is identical to frame member 12 and will not be described in detail. The numeral 24 refers to a conventional camper having opposite sides 26 and 28. As seen in FIG. 2, camper 24 engages the floor 30 of the bed 16.

The numeral 32 refers to the apparatus of this invention and it should be understood that at least a pair of the brackets 32 will ordinarily be used to maintain the camper within the bed. Bracket 32 generally comprises a flat support plate 34 having a plurality of spaced apart bolt openings 36 formed in its upper end. A pair of spaced apart ears 38 and 40 are welded to the exterior surface of the plate 34 and extend outwardly therefrom as viewed in FIG. 4. A plurality of registering bolt openings 42 and 44 are formed in the ears 38 and 40 and are adapted to receive the bolt 46 extending therethrough. A pair of spaced apart ears 48 and 50 are welded or otherwise secured to the lower end of the plate 34 and have bolt openings 52 and 54 formed therein for receiving the bolt 56 therein. Openings 58 (not shown) and 60 extend through the lower corners of the support plate 34 for receiving the bolts 62 and 64 therein respectively.

An elongated bracket arm 66 is pivotally secured to the ears 48 and 50 by the bolt 56 and extends outwardly therefrom. A tie-down ring 68 is provided on the outer end of the bracket arm 66. A bracket arm 70 is secured at its outer end to the bracket arm 66 by welding or the like as illustrated in 64 and extends upwardly and inwardly therefrom. The inner end of the bracket arm 70 is adjustably secured to the ears 38 and 40 by means of the bolt 46.

FIG. 3 illustrates the manner in which the bracket 32 is secured to the frame member 12. The numeral 72 refers to a top clamp having a bolt opening 74 formed therein. The numeral 76 refers to a bottom clamp having a pair of bolt openings 78 and 80 formed therein. As seen in FIG. 3, top clamp 72 embraces the top flange 18 with the bolt 82 extending through one of the openings 36 and through the opening 74 in the top clamp 72 to rigidly secure the upper end of the bracket 34 to the upper end of the frame member. The lower end of the support plate 34 is secured to the frame member 12 by means of the bolts 62 and 64 extending through the openings 58 and 60 and through the openings 78 and 80 in the bottom clamp 76 which embraces the bottom flange 20. It can be seen that the bracket can be secured to frame members having various vertical heights due to the provision of the plurality of bolt openings 36. The plurality of bolt openings 42 and 44 permit the selective adjustable connection of the inner end of the bracket arm 70 to the ears 38 and 40 to permit the outer end of the bracket arm 66 to be selectively raised or lowered to permit the bracket to fit around various sizes of skirts that fit over the vehicle frame.

The numeral 84 refers to a chain means which is secured at its lower end to the tie-down ring 68 and which has a turnbuckle 86 secured to its upper end which is secured to the camper 24. As illustrated in FIG. 2, a bracket 32 is provided on the other side of the vehicle for securing the other side of the camper to the vehicle frame.

The bracket of this invention permits the camper to be rigidly secured to the vehicle frame rather than the vehicle bed as is the case with a large majority of the conventional tie-down systems. The bracket 32 is adjustable to fit various vehicle frame sizes and various vehicle skirt sizes. The relationship of the bracket arm 70 and the bracket arm 66 together with their connection to the support plate 34 insures that a very stable connection is provided between the camper and the vehicle frame. The bracket does not detract from the asthetic appearance of the vehicle and it may be easily removed from the vehicle when the camper is not being used on the vehicle. Thus it can be seen that an improved tie-down apparatus has been provided for a vehicle-mounted camper which accomplishes at least all of its stated objectives.

I claim:

1. In combination, a truck comprising first and second longitudinally extending frame members, a bed means operatively secured to same frame members and having opposite sides, a camper means mounted on said bed means having rearward and forward ends and opposite sides, a first bracket means secured to said first frame member and extending outwardly therefrom, said first bracket means having an outer end, a second bracket means secured to said second frame member and extending outwardly therefrom, said second bracket means having an outer end, each of said bracket means comprising a support plate means secured to one of said frame members, said plate means having upper and lower ends, a first elongated arm means pivotally secured at one end thereof to said plate means at the lower end thereof and extending outwardly therefrom, a second elongated arm means selectively adjustably secured at one end thereof to said plate means at the upper end thereof and extending outwardly and downwardly therefrom, said second arm means being secured at its other end to said first arm means, a first connection means connecting one side of said camper means to the outer end of the first elongated arm of said first bracket means, and a second connection means connecting the other side of said camper means to the outer end of the first elongated arm of said second bracket means.

2. The combination of claim 1 wherein each of said first and second bracket means are detachably connected to said first and second frame members respectively.

3. The combination of claim 1 wherein a clamp means detachably connects each of said bracket means to said frame members.

4. The combination of claim 1 wherein each of said bracket means have inner ends and wherein each of said frame members comprises a channel member having inwardly extending top and bottom flanges, top and bottom clamps detachably securing the inner ends of each of said bracket means to the said top and bottom flanges of said channel members.

5. The combination of claim 1 wherein said one end of said second arm means is secured to said first arm inwardly of the outer end thereof.

6. The combination of claim 1 wherein a top clamp means adjustably secures the upper end of each of said plate means to said frame member, and a bottom clamp means secures the lower end of each of said plate means to the said frame member.

7. The combination of claim 1 wherein each of said connection means comprises a turnbuckle-chain means.

8. The combination of claim 1 wherein each of said connection means is positioned outwardly of said bed means.

* * * * *